United States Patent
Oi et al.

(10) Patent No.: US 10,792,623 B2
(45) Date of Patent: Oct. 6, 2020

(54) DEVICE FOR ADJUSTING SPECIFIC RESISTANCE VALUE AND METHOD FOR ADJUSTING SPECIFIC RESISTANCE VALUE

(71) Applicant: DIC Corporation, Tokyo (JP)

(72) Inventors: Kazumi Oi, Ichihara (JP); Masato Saito, Ichihara (JP); Naoki Hada, Ichihara (JP)

(73) Assignee: DIC Corporation, Tokyo (JP)

( * ) Notice: Subject to any disclaimer, the term of this patent is extended or adjusted under 35 U.S.C. 154(b) by 287 days.

(21) Appl. No.: 15/564,551

(22) PCT Filed: Mar. 31, 2016

(86) PCT No.: PCT/JP2016/060655
§ 371 (c)(1),
(2) Date: Oct. 5, 2017

(87) PCT Pub. No.: WO2016/167134
PCT Pub. Date: Oct. 20, 2016

(65) Prior Publication Data
US 2018/0078909 A1    Mar. 22, 2018

(30) Foreign Application Priority Data

Apr. 13, 2015 (JP) ................. 2015-081563

(51) Int. Cl.
*B01F 3/04* (2006.01)
*B01F 1/00* (2006.01)
(Continued)

(52) U.S. Cl.
CPC .......... *B01F 3/04241* (2013.01); *B01D 63/02* (2013.01); *B01F 1/00* (2013.01);
(Continued)

(58) Field of Classification Search
CPC .. B01D 63/02; B01D 65/08; B01D 2311/243; B01D 2315/20; B01F 3/04241;
(Continued)

(56) References Cited

U.S. PATENT DOCUMENTS 8,158,002 B1    4/2012 Lupton et al.
8,171,956 B2    5/2012 Suganuma et al.

FOREIGN PATENT DOCUMENTS

CN    101031787 A    9/2007
CN    101218181 A    7/2008
(Continued)

OTHER PUBLICATIONS

Office Action dated Jun. 26, 2018, issued for the Japanese patent application No. 2017-512260.
(Continued)

*Primary Examiner* — Charles S Bushey
(74) *Attorney, Agent, or Firm* — Locke Lord LLP; James E. Armstrong, IV; Nicholas J. DiCeglie, Jr.

(57) ABSTRACT

A resistivity adjustment device includes: a hollow fiber membrane module that is divided by a hollow fiber membrane into a liquid phase side area; a liquid supply pipe that communicates with the liquid phase side area; a liquid discharge pipe that communicates with the liquid phase side area; a gas supply pipe that communicates with the gas phase side area; a gas discharge pipe that communicates with the gas phase side area; a bypass pipe that communicates with the liquid supply pipe and the liquid discharge pipe to bypass the hollow fiber membrane module; and a first on-off valve that is connected to the gas discharge pipe and opens or closes a first passage inside the gas discharge pipe, wherein the first on-off valve opens the first passage to discharge water accumulated in the gas phase side area.

18 Claims, 12 Drawing Sheets

(51) Int. Cl.
*B01D 63/02* (2006.01)
*B01F 15/00* (2006.01)
*B01F 15/02* (2006.01)
*B01D 65/08* (2006.01)

(52) U.S. Cl.
CPC .... *B01F 15/00422* (2013.01); *B01F 15/0261* (2013.01); *B01D 65/08* (2013.01); *B01D 2311/243* (2013.01); *B01D 2315/20* (2013.01); *B01F 2003/04404* (2013.01); *B01F 2215/0096* (2013.01)

(58) Field of Classification Search
CPC .. B01F 1/00; B01F 15/00422; B01F 15/0261; B01F 2003/04404; B01F 2215/0096
USPC ......................................................... 261/104
See application file for complete search history.

(56) References Cited

FOREIGN PATENT DOCUMENTS

| | | |
|---|---|---|
| CN | 101508502 A | 8/2009 |
| CN | 100537456 C | 9/2009 |
| CN | 201376902 Y | 1/2010 |
| JP | 06-507335 A | 8/1994 |
| JP | H10-202075 A | 8/1998 |
| JP | 2000-005586 A | 1/2000 |
| JP | 2001-293342 A | 10/2001 |
| JP | 2003-010660 A | 1/2003 |
| JP | 2007-185559 A | 7/2007 |
| JP | 3951385 B2 | 8/2007 |
| JP | 2008-161734 A | 7/2008 |
| JP | 2009-219997 A | 10/2009 |
| JP | 2011-520609 A | 7/2011 |
| JP | 2012-223725 A | 11/2012 |
| KR | 10-2014-0042293 A | 4/2014 |
| TW | 503124 B | 9/2002 |
| WO | 2009/143056 A1 | 11/2009 |

OTHER PUBLICATIONS

Office Action dated Nov. 20, 2018, issued for the Japanese patent application No. 2017-512260.
Office Action dated Apr. 22, 2019, issued for KR Patent Application No. 10-2019-7010860.
International Search Report dated Jun. 28, 2016, issued for PCT/JP2016/060655.
Office Action dated Jun. 11, 2019, issued for TW Patent Application No. 105111301.
International Preliminary Report on Patentability dated Oct. 17, 2017, issued for PCT/JP2016/060655.
Notice of Allowance dated Jul. 9, 2019, issued for JP2017-512260.
Office Action issued in corresponding Chinese Patent Application No. CN 201680021352.2, dated Jan. 6, 2020.

DEVICE FOR ADJUSTING SPECIFIC RESISTANCE VALUE AND METHOD FOR ADJUSTING SPECIFIC RESISTANCE VALUE

TECHNICAL FIELD

The present invention relates to a resistivity adjustment device and a resistivity adjustment method for adjusting a resistivity of a liquid.

BACKGROUND ART

In a semiconductor or liquid crystal manufacturing process, a substrate is cleaned by ultrapure water. In this case, static electricity is generated when a resistivity of ultrapure water is high. As a result, since a dielectric breakdown or a reattachment of fine particles occurs, there is a significant adverse effect on product yield.

In order to solve such a problem, a method of using a hydrophobic hollow fiber membrane module has been proposed. In this method, a gas such as a carbon dioxide gas or an ammonia gas is dissolved in the ultrapure water using the hollow fiber membrane module. Then, ions are generated by dissociation equilibrium and the resistivity of the ultrapure water is decreased by the generated ions.

Further, in processes such as substrate cleaning and dicing, a flow fluctuation of the ultrapure water is severe. Here, Patent Literatures 1 and 2 propose techniques of stabilizing the resistivity even when a flow rate changes. In the technique disclosed in Patent Literature 1, a hollow fiber membrane module that generates a high concentration gas added liquid at a low flow rate and a bypass pipe that allows a passage of ultrapure water at a high flow rate are provided. Then, the generated high concentration gas added liquid is mixed with the ultrapure water passing through the bypass pipe. Accordingly, it is possible to easily adjust the resistivity of the ultrapure water. In the technique disclosed in Patent Literature 2, a plurality of bypass pipes are provided and a shut valve is provided at one or the plurality of bypass pipes. Then, when the flow rate of the ultrapure water decreases, a part or all of the shut valves are opened. Accordingly, it is possible to suppress an increase in resistivity of the ultrapure water due to the low flow rate of the ultrapure water.

CITATION LIST

Patent Literature

Patent Literature 1: Japanese Patent No. 3951385
Patent Literature 2: Japanese Unexamined Patent Publication No. 2012-223725

SUMMARY OF INVENTION

Technical Problem

In such a hollow fiber membrane module, a liquid phase side area to which the ultrapure water flows and a gas phase side area to which the gas flows are separated by the hollow fiber membrane. Then, the gas of the gas phase side area permeates the hollow fiber membrane to be dissolved in the liquid phase side ultrapure water.

However, although the inventor dissolved a carbon dioxide gas or an ammonia gas in the ultrapure water using the hollow fiber membrane module, a phenomenon in which the resistivity of the ultrapure water increased with time in a state where the flow rate of the ultrapure water did not decrease occurred.

Here, an object of the invention is to provide a resistivity adjustment device and a resistivity adjustment method capable of suppressing an increase in resistivity of a liquid for a long period of time.

Solution to Problem

The inventor has carried out a careful examination to attain the above-described object and has found that the above-described phenomenon was caused by the following reasons. That is, a water vapor is dissolved in the ultrapure water. For this reason, when the carbon dioxide gas or the ammonia gas is dissolved in the ultrapure water using the hollow fiber membrane module, the water vapor dissolved in the ultrapure water is diffused back to the gas phase side area. In the gas phase side area, the water vapor diffused back to the gas phase side area is condensed so that the condensed water is accumulated. As a result, since the hollow fiber membrane is covered by the dew condensation water, the gas of the gas phase side area cannot permeate the hollow fiber membrane. The inventor has contrived the invention on the basis of the knowledge.

That is, a resistivity adjustment device according to one aspect of the invention includes: a hollow fiber membrane module that is divided by a hollow fiber membrane into a liquid phase side area to which a liquid adjusting a resistivity is supplied and a gas phase side area to which an adjustment gas adjusting a resistivity is supplied and dissolves the adjustment gas in the liquid; a liquid supply pipe that communicates with the liquid phase side area to supply the liquid to the liquid phase side area; a liquid discharge pipe that communicates with the liquid phase side area to discharge the liquid from the liquid phase side area; a gas supply pipe that communicates with the gas phase side area to supply the adjustment gas to the gas phase side area; a gas discharge pipe that communicates with the gas phase side area to discharge the adjustment gas from the gas phase side area; a bypass pipe that communicates with the liquid supply pipe and the liquid discharge pipe to bypass the hollow fiber membrane module; and a first on-off valve that is connected to the gas discharge pipe and opens or closes a first passage inside the gas discharge pipe, in which the first on-off valve opens the first passage to discharge water accumulated in the gas phase side area.

In the resistivity adjustment device according to one aspect of the invention, the liquid adjusting the resistivity is supplied from the liquid supply pipe to the liquid phase side area of the hollow fiber membrane module and is discharged to the liquid discharge pipe. The adjustment gas adjusting the resistivity is supplied from the gas supply pipe to the gas phase side area of the hollow fiber membrane module and is discharged to the gas discharge pipe. In the hollow fiber membrane module, the adjustment gas supplied to the gas phase side area permeates the hollow fiber membrane to be dissolved in the liquid supplied to the liquid phase side area. Then, the liquid having the adjustment gas dissolved therein and the liquid passing through the bypass pipe are mixed with each other by the hollow fiber membrane module. Accordingly, it is possible to easily adjust the resistivity of the liquid regardless of the flow rate of the liquid.

Meanwhile, the water vapor dissolved in the liquid permeates the hollow fiber membrane to be diffused back to the gas phase side area. The water vapor diffused back to the gas phase side area is condensed to become water. Then, this water is accumulated in the gas phase side area. However, in the resistivity adjustment device, the water accumulated in the gas phase side area is discharged from the first on-off valve when the first passage inside the gas discharge pipe is opened by the first on-off valve. Accordingly, it is possible to suppress a problem in which the adjustment gas of the gas phase side area cannot pass through the hollow fiber membrane due to the water accumulated in the gas phase side area. For this reason, when the first passage is opened by the first on-off valve every regular time or whenever a predetermined amount of water is accumulated in the gas phase side area, it is possible to suppress an increase in resistivity of the liquid for a long period of time.

In one embodiment, the resistivity adjustment device may further include a timer unit which opens or closes the first on-off valve every regular time.

Further, in one embodiment, when the first on-off valve is opened, a flow rate of a fluid passing through the first on-off valve may be equal to or higher than 1 [L/min] and equal to or lower than 300 [L/min].

Further, in one embodiment, the gas discharge pipe may communicate with the gas phase side area at a lower portion of the hollow fiber membrane module.

Further, in one embodiment, the resistivity adjustment device may further include a leakage portion which is connected to the gas discharge pipe to be parallel to the first on-off valve and allows a leakage of the adjustment gas of the gas phase side area.

Further, in one embodiment, the flow rate of the fluid passing through the first on-off valve when the first on-off valve is opened may be higher than a flow rate of the adjustment gas passing through the leakage portion.

Further, in one embodiment, the flow rate of the adjustment gas passing through the leakage portion may be equal to or higher than 0 [mL/min] and equal to or lower than 1000 [mL/min].

Further, in one embodiment, the resistivity adjustment device may further include a second bypass pipe that communicates with the liquid supply pipe and the liquid discharge pipe to bypass the hollow fiber membrane module; and a second on-off valve which opens or closes a second passage inside the second bypass pipe.

A resistivity adjustment method according to one aspect of the invention is a resistivity adjustment method of adjusting a resistivity of a liquid by a hollow fiber membrane module that is divided by a hollow fiber membrane into a liquid phase side area to which a liquid adjusting a resistivity is supplied and a gas phase side area to which an adjustment gas adjusting a resistivity is supplied and dissolves the adjustment gas in the liquid, the resistivity adjustment method including: a resistivity adjustment step of adjusting the resistivity of the liquid by dissolving the adjustment gas in the liquid in such a manner that the adjustment gas passes through the gas phase side area while the liquid passes through the liquid phase side area and mixing the liquid having the adjustment gas dissolved therein with the liquid bypassing the hollow fiber membrane module; and a discharge step of discharging water accumulated in the gas phase side area by a first on-off valve opening or closing a first passage communicating with the gas phase side area, in which in the resistivity adjustment step, the first passage is closed by the first on-off valve, and in which in the discharge step, the first passage is opened by the first on-off valve.

In the resistivity adjustment method according to one aspect of the invention, the liquid having the adjustment gas dissolved therein and the liquid bypassing the hollow fiber membrane module are mixed with each other by the hollow fiber membrane module in the resistivity adjustment step. Accordingly, it is possible to easily adjust the resistivity of the liquid regardless of the flow rate of the liquid. At this time, when the first passage is closed by the first on-off valve, it is possible to suppress the usage amount of the adjustment gas.

Then, in the discharge step, the first passage is opened by the first on-off valve so that the water accumulated in the gas phase side area is discharged from the first on-off valve. Accordingly, it is possible to suppress a problem in which the adjustment gas of the gas phase side area cannot pass through the hollow fiber membrane due to the water accumulated in the gas phase side area. For this reason, when the discharge step is performed every regular time or whenever a predetermined amount of water is accumulated in the gas phase side area, it is possible to suppress an increase in resistivity of the liquid for a long period of time.

In one embodiment, in the resistivity adjustment step, the adjustment gas of the gas phase side area may leak from a leakage portion communicating with the first passage to be parallel to the first on-off valve.

Advantageous Effects of Invention

According to the invention, it is possible to suppress an increase in resistivity for a long period of time.

DESCRIPTION OF EMBODIMENTS

Figure 1:
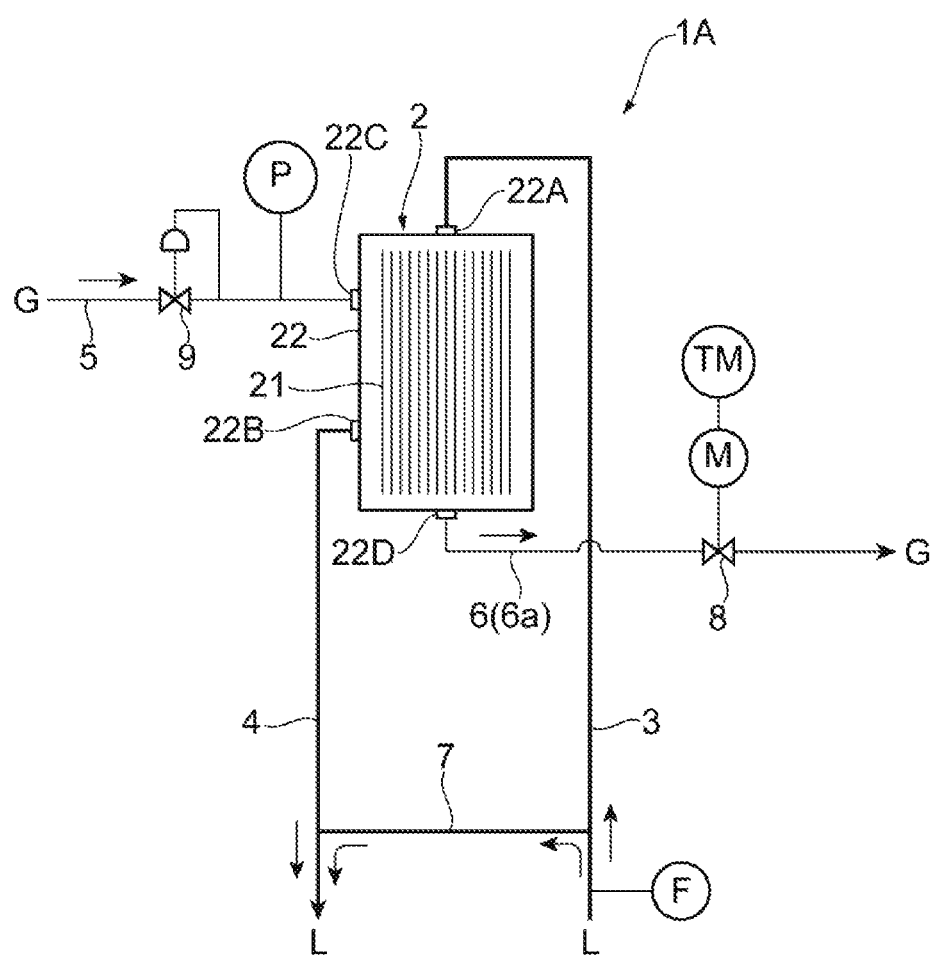
FIG. 1 is a schematic diagram of a resistivity adjustment device of a first embodiment.

Hereinafter, a resistivity adjustment device and a resistivity adjustment method of embodiments will be described in detail with reference to the drawings. Further, in all drawings, the same or corresponding parts are denoted by the same reference numerals and the repetitive description is omitted.

First Embodiment

FIG. 1 is a schematic diagram of a resistivity adjustment device of a first embodiment. As illustrated in FIG. 1, a resistivity adjustment device 1A of the embodiment includes a hollow fiber membrane module 2, a liquid supply pipe 3, a liquid discharge pipe 4, a gas supply pipe 5, a gas discharge pipe 6, a bypass pipe 7, and a first on-off valve 8.

The hollow fiber membrane module 2 dissolves an adjustment gas G for adjusting a resistivity in a liquid L adjusting a resistivity. A liquid used as the liquid L is not particularly limited, but, for example, ultrapure water for cleaning a semiconductor, a liquid crystal, and the like can be used. In general, the resistivity of the ultrapure water is in a range equal to or larger than 17.5 [MΩ·cm] and equal to or smaller than 18.2 [MΩ·cm]. A gas used as the adjustment gas G is not particularly limited, but for example, a carbon dioxide gas or an ammonia gas can be used. The hollow fiber membrane module 2 includes a plurality of hollow fiber membranes 21 and a housing 22 which accommodates the hollow fiber membranes 21.

The hollow fiber membrane 21 is a hollow fiber membrane which allows the permeation of a gas, but does not allow the permeation of a liquid. The material, the fiber shape, and the fiber form of the hollow fiber membrane 21 are not particularly limited. The housing 22 is a hermetic container which accommodates the hollow fiber membrane 21.

The hollow fiber membrane module 2 can be divided by the hollow fiber membrane 21 into a liquid phase side area LA and a gas phase side area GA. The liquid phase side area LA is an area to which the liquid L adjusting the resistivity is supplied among the areas inside the hollow fiber membrane module 2. The gas phase side area GA is an area to which the adjustment gas G adjusting the resistivity is supplied among the areas inside the hollow fiber membrane module 2. As the type of the hollow fiber membrane module 2, an internal perfusion type and an external perfusion type are known. In the embodiment, any one of the internal perfusion type and the external perfusion type may be used. In the hollow fiber membrane module 2 of the external perfusion type, the inside (the inner surface side) of the hollow fiber membrane 21 serves as the gas phase side area GA and the outside (the outer surface side) of the hollow fiber membrane 21 serves as the liquid phase side area LA. In the hollow fiber membrane module 2 of the internal perfusion type, the inside (the inner surface side) of the hollow fiber membrane 21 serves as the liquid phase side area LA and the outside (the outer surface side) of the hollow fiber membrane 21 serves as the gas phase side area GA.

The housing 22 is provided with a liquid supply port 22A, a liquid discharge port 22B, a gas supply port 22C, and a gas discharge port 22D. The liquid supply port 22A is an opening formed in the housing 22 to supply the liquid L to the liquid phase side area LA. The liquid discharge port 22B is an opening formed in the housing 22 to discharge the liquid L from the liquid phase side area LA. The gas supply port 22C is an opening formed in the housing 22 to supply the adjustment gas G to the gas phase side area GA. The gas discharge port 22D is an opening formed in the housing 22 to discharge the adjustment gas G from the gas phase side area GA. For this reason, the liquid supply port 22A and the liquid discharge port 22B communicate with the liquid phase side area LA. Further, the gas supply port 22C and the gas discharge port 22D communicate with the gas phase side area GA.

The positions of the liquid supply port 22A, the liquid discharge port 22B, the gas supply port 22C, and the gas discharge port 22D are not particularly limited. However, the gas discharge port 22D is desirably formed at the lower portion of the hollow fiber membrane module 2 and is more desirably formed at the lowest end of the gas phase side area GA. The lower portion of the hollow fiber membrane module 2 indicates the lower portion of the hollow fiber membrane module 2 in the vertical direction when the resistivity adjustment device 1A is installed. The lowest end of the gas phase side area GA indicates the lowest end of the gas phase side area GA in the vertical direction when the resistivity adjustment device 1A is installed.

The liquid supply pipe 3 communicates with the liquid phase side area LA to supply the liquid L to the liquid phase side area LA. The liquid supply pipe 3 is a tubular member having a passage (not illustrated) formed therein. The liquid supply pipe 3 is connected to the liquid supply port 22A. The material, the characteristics (hardness, elasticity, and the like), the shape, the size, and the like of the liquid discharge pipe 4 are not particularly limited.

A flowmeter F is connected to the liquid supply pipe 3. The flowmeter F measures the flow rate of the liquid L flowing in the liquid supply pipe 3. Then, a control unit (not illustrated) which controls the resistivity adjustment device 1A supplies the liquid L to the liquid supply pipe 3 at a predetermined flow rate on the basis of the flow rate of the liquid L measured by the flowmeter F. As the flowmeter F, various known flowmeters can be employed.

The liquid discharge pipe 4 communicates with the liquid phase side area LA and discharges the liquid L from the liquid phase side area LA. The liquid discharge pipe 4 is a tubular member having a passage (not illustrated) formed therein. The liquid discharge pipe 4 is connected to the liquid discharge port 22B. The material, the characteristics (hardness, elasticity, and the like), the shape, the size, and the like of the liquid discharge pipe 4 are not particularly limited.

The gas supply pipe 5 communicates with the gas phase side area GA to supply the adjustment gas G to the gas phase side area GA. The gas supply pipe 5 is a tubular member having a passage (not illustrated) formed therein. The gas supply pipe 5 is connected to the gas supply port 22C. The material, the characteristics (hardness, elasticity, and the like), the shape, the size, and the like of the gas supply pipe 5 are not particularly limited.

The pressure adjustment valve 9 and the pressure gauge P are connected to the gas supply pipe 5. The pressure adjustment valve 9 adjusts a gas pressure of the adjustment gas passing through the pressure adjustment valve 9. That is, the gas pressure of the adjustment gas G in the gas phase side area GA is adjusted by the pressure adjustment valve 9. As the pressure adjustment valve 9, various known pressure adjustment valves can be employed. The pressure gauge P measures the gas pressure of the adjustment gas G flowing in the gas supply pipe 5. The pressure gauge P is connected to the downstream side of the pressure gauge P in the gas supply pipe 5, that is, the gas phase side area GA of the pressure gauge P. As the pressure gauge P, various known pressure gauge can be employed and for example, a diaphragm valve can be employed. Then, a control unit (not illustrated) which controls the resistivity adjustment device 1A controls the pressure adjustment valve 9 on the basis of the gas pressure of the adjustment gas G measured by the pressure gauge P so that the gas pressure of the adjustment gas G passing through the pressure adjustment valve 9, that is, the gas pressure of the adjustment gas G in the gas phase side area GA becomes a predetermined value (or within a predetermined range).

The gas discharge pipe 6 communicates with the gas phase side area GA to discharge the adjustment gas G from the gas phase side area GA. The gas discharge pipe 6 is a tubular member having a passage formed therein. In addition, the passage inside the gas discharge pipe 6 will be particularly referred to as a first passage 6*a*. The gas discharge pipe 6 is connected to the gas discharge port 22D. The material, the characteristics (hardness, elasticity, and the like), the shape, the size, and the like of the gas discharge pipe 6 are not particularly limited.

The bypass pipe 7 communicates with the liquid supply pipe 3 and the liquid discharge pipe 4 to bypass the hollow fiber membrane module 2. The bypass pipe 7 is a tubular member having a passage formed therein. One end of the bypass pipe 7 is connected to the liquid supply pipe 3 at the upstream side of the hollow fiber membrane module 2. The other end of the bypass pipe 7 is connected to the liquid discharge pipe 4 at the downstream side of the hollow fiber membrane module 2. For this reason, the liquid L supplied to the liquid supply pipe 3 is distributed to the liquid L which flows to the liquid discharge pipe 4 through the hollow fiber membrane module 2 and the liquid L which flows from the bypass pipe 7 to the liquid discharge pipe 4 while bypassing the hollow fiber membrane module 2. At this time, the inner diameter (the passage diameter) of the bypass pipe 7 is set so that the flow rate of the liquid L flowing to the liquid discharge pipe 4 through the hollow fiber membrane module 2 becomes higher than the flow rate of the liquid L flowing to the liquid discharge pipe 4 while bypassing the hollow fiber membrane module 2.

The first on-off valve 8 is connected to the gas discharge pipe 6 and opens or closes the first passage 6*a* inside the gas discharge pipe 6. The first on-off valve 8 is an on-off valve including a passage (not illustrated) through which a fluid passes and a valve body (not illustrated) which opens or closes the passage. In addition, a fluid which passes through the first on-off valve 8 when the first on-off valve 8 opens the first passage 6*a* includes the adjustment gas G, water (dew condensation water), and a gas dissolved in the liquid L. The fluid will be described later in detail.

In the case where the first on-off valve 8 is opened (the passage of the first on-off valve 8 is fully opened), the flow rate of the fluid passing through the first on-off valve 8 is desirably equal to or higher than 1 [L/min] and equal to or lower than 300 [L/min]. In this case, the flow rate of the fluid passing through the first on-off valve 8 is more desirably equal to or higher than 10 [L/min] and equal to or lower than 100 [L/min] and is particularly desirably equal to or higher than 50 [L/min] and equal to or lower than 80 [L/min]. The flow rate of the fluid passing through the first on-off valve 8 is obtained by a relation among the inner pressure of the gas phase side area GA, the passage diameter of the first on-off valve 8, and the passage length thereof. For example, in the case where the inner pressure of the gas phase side area GA is 0.1 [MPa], the passage diameter (the diameter) of the first on-off valve 8 is 4 [cm], and the passage length thereof is 10 [cm], the flow rate of the fluid passing through the first on-off valve 8 becomes 60 [L/min].

The timer unit TM is connected to the first on-off valve 8. The timer unit TM opens or closes the first on-off valve 8 every regular time (every predetermined time). The timer unit TM normally closes the first passage 6*a* by the first on-off valve 8. In addition, a state where the first passage 6*a* is closed by the first on-off valve 8 indicates a state where the passage of the first on-off valve 8 is closed by the valve body of the first on-off valve 8. Meanwhile, when a predetermined time elapses, the timer unit TM operates the first on-off valve 8 to open the first passage 6*a* by the first on-off valve 8 only for a predetermined time. A state where the first passage 6*a* is opened by the first on-off valve 8 indicates a state where the valve body of the first on-off valve 8 closing the passage of the first on-off valve 8 is moved to open the passage of the first on-off valve 8. A time in which the first passage 6*a* is opened by the first on-off valve 8 is appropriately set.

Next, a method of adjusting the resistivity of the liquid L by the resistivity adjustment device 1A will be described.

First, a resistivity adjustment step is performed. In the resistivity adjustment step, the adjustment gas is caused to pass through the gas phase side area GA while the liquid L is caused to pass through the liquid phase side area LA so that the adjustment gas G is dissolved in the liquid L. Then, the liquid L having the adjustment gas G dissolved therein and the liquid L bypassing the hollow fiber membrane module 2 are mixed with each other to adjust the resistivity of the liquid L.

Specifically, in the resistivity adjustment step, first, the first passage 6*a* is closed by the first on-off valve 8, the liquid L is supplied to the liquid supply pipe 3, and the adjustment gas G is supplied to the gas supply pipe 5. Then, the liquid L is supplied from the liquid supply pipe 3 to the liquid phase side area LA of the hollow fiber membrane module 2 and is discharged to the liquid discharge pipe 4. Further, the liquid L passes through the bypass pipe 7 from the liquid supply pipe 3 to bypass the hollow fiber membrane module 2 and is discharged to the liquid discharge pipe 4. The adjustment gas G is supplied from the gas supply pipe 5 to the gas phase side area GA of the hollow fiber membrane module 2 and is discharged to the gas discharge pipe 6.

In the hollow fiber membrane module 2, the adjustment gas G supplied to the gas phase side area GA permeates the hollow fiber membrane 21 to be dissolved in the liquid L supplied to the liquid phase side area LA. Then, the liquid L having the adjustment gas G dissolved therein by the hollow fiber membrane module 2 and the liquid L passing through the bypass pipe 7 are mixed with each other. Accordingly, the resistivity of the liquid L can be easily adjusted regardless of the flow rate of the liquid L.

Incidentally, the liquid L includes a water vapor. The water vapor dissolved in the liquid L permeates the hollow fiber membrane 21 to be diffused back to the gas phase side area GA. The water vapor which is diffused back to the gas phase side area GA is condensed to become water (dew condensation water). Then, this water is accumulated in the gas phase side area GA. Further, there is a case where a dissolved gas such as oxygen and nitrogen other than the water vapor is dissolved in the liquid L. In addition, the dissolved gas also includes the water vapor. In such a case, the dissolved gas is also diffused back to the gas phase side area GA while permeating the hollow fiber membrane 21.

Here, a discharge step is subsequently performed. In the discharge step, the water accumulated in the gas phase side area GA is discharged by the first on-off valve 8 opening or closing the first passage 6*a* communicating with the gas phase side area GA.

Specifically, in the discharge step, the first passage 6*a* inside the gas discharge pipe 6 is opened by the first on-off valve 8. Then, the water accumulated in the gas phase side area GA and the dissolved gas diffused back to the gas phase side area GA are discharged from the first on-off valve 8. Accordingly, it is possible to suppress a problem in which the adjustment gas G of the gas phase side area GA cannot pass through the hollow fiber membrane 21 by the water accumulated in the gas phase side area GA.

This discharge step is periodically performed. That is, when a predetermined time elapses after the activation of the resistivity adjustment device 1A or a predetermined time elapses from the precedent discharge step, the timer unit TM operates the first on-off valve 8 to open the first passage 6a by the first on-off valve 8 only for a predetermined time. In addition, the interval of the discharge step and the time of the discharge step are appropriately set. For example, the interval of the discharge step may be set to be equal to or longer than 0.1 seconds and equal to or shorter than 500 hours. In this case, the time in which the first passage 6a is opened by the first on-off valve 8 is desirably equal to or longer than 0.5 seconds and equal to or shorter than 1 minute and more desirably equal to or longer than 1 second and equal to or shorter than 10 seconds. The interval of the discharge step indicates a time until the next discharge step starts after the end of the precedent discharge step. The time of the discharge step is a time in which the first passage 6a is opened by the first on-off valve 8 in the discharge step.

In this way, in the resistivity adjustment device 1A of the embodiment, since the water is discharged from the gas phase side area GA when the first on-off valve 8 is opened or closed, it is possible to suppress an increase in resistivity of the liquid L for a long period of time. Similarly, it is possible to suppress a decrease in concentration of the adjustment gas G (a decrease in partial pressure of the adjustment gas G) in the gas phase side area GA due the dissolved gas diffused back to the gas phase side area GA.

Further, in the resistivity adjustment device 1A of the embodiment, since the timer unit TM periodically opens or closes the first on-off valve 8, it is possible to simply suppress a problem in which the dissolved gas is diffused back to the gas phase side area GA and the water is accumulated in the gas phase side area GA.

Further, in the resistivity adjustment device 1A of the embodiment, since the flow rate of the fluid passing through the first on-off valve 8 is set to the above-described range, it is possible to discharge the water accumulated in the gas phase side area GA and the dissolved gas diffused back to the gas phase side area GA at one time. Accordingly, since it is possible to shorten a time of opening the first on-off valve 8 to discharge the water and the dissolved gas, it is possible to decrease the discharge amount of the adjustment gas G discharged from the first on-off valve 8. Furthermore, in the gas phase side area GA, an air stream directed toward the first on-off valve 8 is formed and the air stream acts so that the dew condensation water adhering to the hollow fiber membrane 21 is pushed toward the first on-off valve 8. Accordingly, it is possible to improve an effect of discharging the water accumulated in the gas phase side area GA.

Further, the water condensed in the gas phase side area moves downward in the hollow fiber membrane module due to the gravity. In the resistivity adjustment device 1A of the embodiment, since the gas discharge pipe 6 communicates with the gas phase side area GA at the lower portion of the hollow fiber membrane module 2, it is possible to discharge the water condensed in the gas phase side area GA from the gas phase side area GA to the gas discharge pipe 6 due to the gravity. Accordingly, it is possible to improve an effect of discharging the water accumulated in the gas phase side area GA.

Further, in the resistivity adjustment method of the embodiment, in the resistivity adjustment step, the liquid L having the adjustment gas G dissolved therein and the liquid L bypassing the hollow fiber membrane module 2 are mixed with each other by the hollow fiber membrane module 2. Accordingly, it is possible to easily adjust the resistivity of the liquid L regardless of the flow rate of the liquid L. At this time, when the first passage 6a is closed by the first on-off valve 8, it is possible to suppress the usage amount of the adjustment gas G.

Then, in the discharge step, the first passage 6a is opened by the first on-off valve 8 so that the water accumulated in the gas phase side area GA is discharged from the first on-off valve 8. Accordingly, it is possible to suppress a problem in which the adjustment gas G of the gas phase side area GA cannot pass through the hollow fiber membrane 21 due to the water accumulated in the gas phase side area GA. For this reason, when the discharge step is performed every regular time or whenever a predetermined amount of water is accumulated in the gas phase side area GA, it is possible to suppress an increase in resistivity of the liquid L for a long period of time.

Second Embodiment

Next, a second embodiment will be described. The second embodiment is basically the same as the first embodiment and is different from the first embodiment only in that the leakage portion is further provided. For this reason, in the description below, only the different points from the first embodiment will be described and the same points as the first embodiment will not be described.

Figure 2:
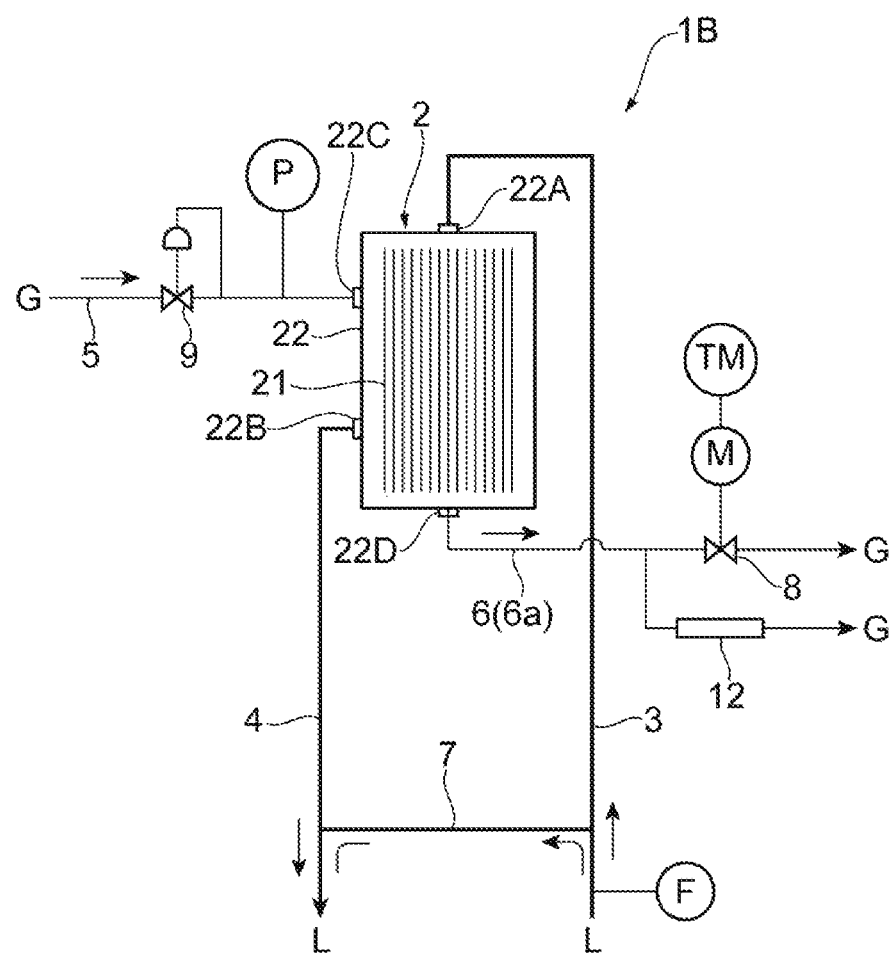
FIG. 2 is a schematic diagram of a resistivity adjustment device of a second embodiment.

FIG. 2 is a schematic diagram of a resistivity adjustment device of the second embodiment. As illustrated in FIG. 2, a resistivity adjustment device 1B of the embodiment includes the hollow fiber membrane module 2, the liquid supply pipe 3, the liquid discharge pipe 4, the gas supply pipe 5, the gas discharge pipe 6, the bypass pipe 7, the first on-off valve 8, and a leakage portion 12.

The leakage portion 12 is connected to the gas discharge pipe 6 to be parallel to the first on-off valve 8 so that the adjustment gas G of the gas phase side area GA leaks therefrom. The leakage portion 12 is a capillary member having a thin passage (not illustrated) formed therein. In addition, the leakage portion 12 is not provided with a valve closing the passage like the first on-off valve 8. That is, the adjustment gas G leaks from the leakage portion 12.

In the case where the first on-off valve 8 is opened, the flow rate of the fluid passing through the first on-off valve 8 is higher than the flow rate of the adjustment gas G passing through the leakage portion 12. In other words, the flow rate of the adjustment gas G passing through the leakage portion 12 becomes lower than the flow rate of the fluid passing through the first on-off valve 8 in the case where the first on-off valve 8 is opened.

The flow rate of the adjustment gas G passing through the leakage portion 12 is desirably equal to or higher than 0 [mL/min] and equal to lower than 1000 [mL/min]. In this case, in the case where the first on-off valve 8 is regularly opened or closed, the flow rate of the adjustment gas G passing through the leakage portion 12 can be decreased as the gap in the open state becomes shortened and thus the flow rate can become 0 [mL/min]. Further, the flow rate of the adjustment gas G passing through the leakage portion 12 is more desirably equal to or higher than 1 [mL/min] and equal to or lower than 500 [mL/min] and particularly desirably equal to or higher than 5 [mL/min] and equal to or lower than 100 [mL/min]. The flow rate of the adjustment gas G passing through the leakage portion 12 is obtained by a relation between the inner pressure of the gas phase side area GA and the passage diameter of the leakage portion 12. For example, in the case where the inner pressure of the gas phase side area GA is 0.1 [MPa], the passage diameter (the diameter) of the leakage portion 12 is 4 [cm], and the passage length thereof is 10 [cm], the flow rate of the adjustment gas G passing through the leakage portion 12 becomes 60 [L/min].

Next, a method of adjusting the resistivity of the liquid L by the resistivity adjustment device 1B will be described.

In the resistivity adjustment step, the first passage 6a is first closed by the first on-off valve 8 so that the liquid L is supplied to the liquid supply pipe 3 and the adjustment gas G is supplied to the gas supply pipe 5. Then, the liquid L is supplied from the liquid supply pipe 3 to the liquid phase side area LA of the hollow fiber membrane module 2 and is discharged from the liquid discharge pipe 4. Further, the liquid L passes through the bypass pipe 7 from the liquid supply pipe 3 to bypass the hollow fiber membrane module 2 and is discharged to the liquid discharge pipe 4. The adjustment gas G is supplied from the gas supply pipe 5 to the gas phase side area GA of the hollow fiber membrane module 2 and is discharged to the gas discharge pipe 6. Then, the adjustment gas G discharged to the gas discharge pipe 6 leaks from the leakage portion 12.

In this way, there is a case where a dissolved gas such as oxygen and nitrogen other than the water vapor is dissolved in the liquid L supplied from the liquid supply pipe 3 to the hollow fiber membrane module 2. In addition, the dissolved gas also includes the water vapor. In such a case, the dissolved gas is diffused back to the gas phase side area GA while permeating the hollow fiber membrane 21. Then, since the concentration of the adjustment gas G of the gas phase side area GA decreases (the partial pressure of the adjustment gas G decreases), the dissolving efficiency of the adjustment gas G with respect to the liquid L decreases.

Here, in the resistivity adjustment device 1B of the embodiment, the leakage portion 12 is connected to the gas discharge pipe 6 to be parallel to the first on-off valve 8 and the adjustment gas G of the gas phase side area GA leaks from the leakage portion 12. Accordingly, since the adjustment gas G is continuously supplied from the gas supply pipe 5 to the gas phase side area GA, it is possible to suppress a decrease in concentration of the adjustment gas G of the gas phase side area GA.

Further, in the resistivity adjustment device 1B of the embodiment, the flow rate of the fluid passing through the first on-off valve 8 is higher than the flow rate of the adjustment gas G passing through the leakage portion 12. Accordingly, it is possible to decrease the discharge amount of the adjustment gas G discharged from the leakage portion 12 while effectively discharging the water accumulated in the gas phase side area GA.

Further, in the resistivity adjustment device 1B of the embodiment, since the flow rate of the adjustment gas G passing through the leakage portion 12 is set to the above-described range, it is possible to decrease the discharge amount of the adjustment gas G discharged from the leakage portion 12 while suppressing a decrease in concentration of the adjustment gas G in the gas phase side area GA.

Further, in the resistivity adjustment method of the embodiment, in the resistivity adjustment step, the adjustment gas G of the gas phase side area GA leaks from the leakage portion 12. Accordingly, since the adjustment gas G is continuously supplied from the gas supply pipe 5 to the gas phase side area GA, it is possible to suppress a decrease in concentration of the adjustment gas G of the gas phase side area GA.

Third Embodiment

Next, a third embodiment will be described. The third embodiment is basically the same as the first embodiment and is different from the first embodiment only in that a plurality of bypass pipes are provided. For this reason, in the description below, only the different points from the first embodiment will be described and the same points as the first embodiment will not be described.

Figure 3:
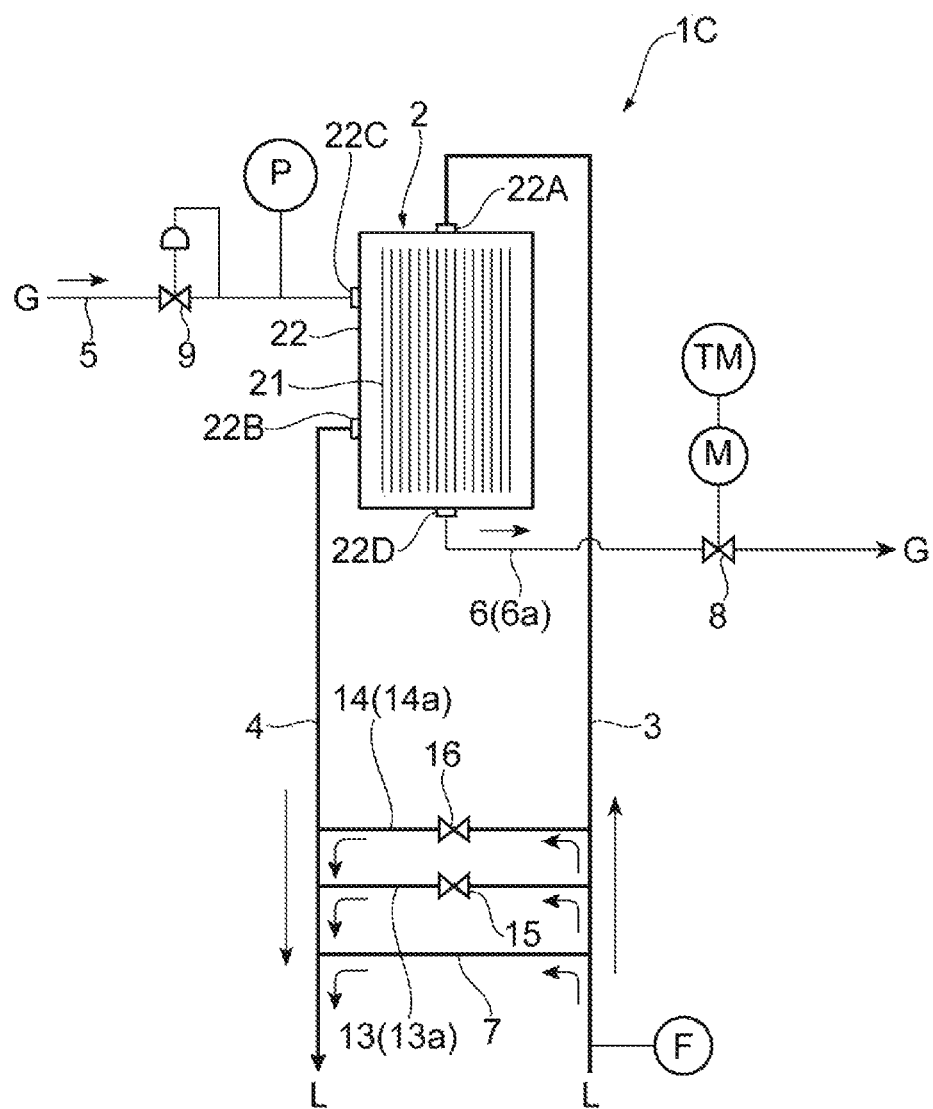
FIG. 3 is a schematic diagram of a resistivity adjustment device of a third embodiment.

FIG. 3 is a schematic diagram of a resistivity adjustment device of the third embodiment. As illustrated in FIG. 3, a resistivity adjustment device 1C of the embodiment includes the hollow fiber membrane module 2, the liquid supply pipe 3, the liquid discharge pipe 4, the gas supply pipe 5, the gas discharge pipe 6, the bypass pipe 7, the first on-off valve 8, a second bypass pipe 13, and a second bypass pipe 14.

The second bypass pipe 13 communicates with the liquid supply pipe 3 and the liquid discharge pipe 4 to bypass the hollow fiber membrane module 2. The second bypass pipe 13 is a tubular member having a passage formed therein. The passage inside the second bypass pipe 13 will be particularly referred to as a second passage 13a. One end of the second bypass pipe 13 is connected to the liquid supply pipe 3 at the upstream side of the hollow fiber membrane module 2 and the downstream side of the connection position between the liquid supply pipe 3 and the bypass pipe 7. The other end of the second bypass pipe 13 is connected to the liquid discharge pipe 4 at the downstream side of the hollow fiber membrane module 2 and the upstream side of the connection position between the liquid discharge pipe 4 and the bypass pipe 7.

The second bypass pipe 14 communicates with the liquid supply pipe 3 and the liquid discharge pipe 4 to bypass the hollow fiber membrane module 2. The second bypass pipe 14 is a tubular member having a passage formed therein. The passage inside the second bypass pipe 14 will be particularly referred to as a second passage 14a. One end of the second bypass pipe 14 is connected to the liquid supply pipe 3 at the upstream side of the hollow fiber membrane module 2 and the downstream side of the connection position between the liquid supply pipe 3 and the second bypass pipe 13. The other end of the second bypass pipe 14 is connected to the liquid discharge pipe 4 at the downstream side of the hollow fiber membrane module 2 and the upstream side of the connection position between the liquid discharge pipe 4 and the second bypass pipe 13.

For this reason, the liquid L supplied to the liquid supply pipe 3 is distributed to the liquid L which passes through the hollow fiber membrane module 2 and flows to the liquid discharge pipe 4, the liquid L which bypasses the hollow fiber membrane module 2 and flows from the bypass pipe 7 to the liquid discharge pipe 4, the liquid L which bypasses the hollow fiber membrane module 2 and flows from the second bypass pipe 13 to the liquid discharge pipe 4, and the liquid L which bypasses the hollow fiber membrane module 2 and flows from the second bypass pipe 14 to the liquid discharge pipe 4. That is, the liquid L supplied to the liquid supply pipe 3 is distributed to the liquid L which passes through the hollow fiber membrane module 2 and flows to the liquid discharge pipe 4 and the liquid L which bypasses the hollow fiber membrane module 2 and flows to the liquid discharge pipe 4. At this time, the inner diameters (the passage diameters) of the bypass pipe 7, the second bypass pipe 13, and the second bypass pipe 14 are set so that the flow rate of the liquid L which passes through the hollow fiber membrane module 2 and flows to the liquid discharge pipe 4 becomes higher than the total flow rate of the liquid L which bypasses the hollow fiber membrane module 2 and flows to the liquid discharge pipe 4.

The second on-off valve 15 is connected to the second bypass pipe 13. The second on-off valve 15 opens or closes the second passage 13a inside the second bypass pipe 13. The second on-off valve 15 is an on-off valve including a passage (not illustrated) through which a fluid passes and a valve body (not illustrated) which opens or closes the passage.

The second on-off valve 16 is connected to the second bypass pipe 14. The second on-off valve 16 opens or closes the second passage 14a inside the second bypass pipe 14. The second on-off valve 16 is an on-off valve including a passage (not s illustrated) through which a fluid passes and a valve body (not illustrated) which opens or closes the passage.

Next, a method of adjusting the resistivity of the liquid L by the resistivity adjustment device 1C will be described.

In the resistivity adjustment step, the first passage 6a is closed by the first on-off valve 8, the second passage 13a is closed by the second on-off valve 15, and the second passage 14a is closed by the second on-off valve 16 so that the liquid L is supplied to the liquid supply pipe 3 and the adjustment gas G is supplied to the gas supply pipe 5. Then, the liquid L is supplied from the liquid supply pipe 3 to the liquid phase side area LA of the hollow fiber membrane module 2 and is discharged to the liquid discharge pipe 4. Further, the liquid L passes through the bypass pipe 7, the second bypass pipe 13, and the second bypass pipe 14 so as to bypass the hollow fiber membrane module 2 from the liquid supply pipe 3 and is discharged to the liquid discharge pipe 4. The adjustment gas G is supplied from the gas supply pipe 5 to the gas phase side area GA of the hollow fiber membrane module 2 and is discharged to the gas discharge pipe 6.

In the hollow fiber membrane module 2, the adjustment gas G supplied to the gas phase side area GA permeates the hollow fiber membrane 21 to be dissolved in the liquid L supplied to the liquid phase side area LA. Then, the liquid L having the adjustment gas G dissolved therein by the hollow fiber membrane module 2 and the liquid L passing through the bypass pipe 7, the second bypass pipe 13, and the second bypass pipe 14 are mixed with each other. Accordingly, it is possible to easily adjust the resistivity of the liquid L regardless of the flow rate of the liquid L.

Here, a case in which the flow rate of the liquid L supplied to the liquid supply pipe 3 decreases will be supposed.

The pressure loss of the liquid L flowing in the hollow fiber membrane module 2 is higher than the pressure loss of the liquid L flowing in the bypass pipe 7, the second bypass pipe 13, and the second bypass pipe 14. For this reason, when the flow rate of the liquid L decreases, the ratio of the flow rate of the liquid L flowing to the hollow fiber membrane module 2 with respect to the flow rate of the liquid L flowing to the bypass pipe 7, the second bypass pipe 13, and the second bypass pipe 14 decreases. As a result, the concentration of the gas dissolved in the liquid L decreases and the resistivity of the liquid L increases.

Here, the second passage 13a and the second passage 14a are opened by the second on-off valve 15 and the second on-off valve 16 in a not mal state. Then, when the flow rate of the liquid L decreases, at least one of the second passage 13a and the second passage 14a is closed by at least one of the second on-off valve 15 and the second on-off valve 16. That is, only the second passage 13a may be closed by the second on-off valve 15, only the second passage 14a may be closed by the second on-off valve 16, or both the second passage 13a and the second passage 14a may be closed by the second on-off valve 15 and the second on-off valve 16. Then, since the pressure loss of the liquid L bypassing the hollow fiber membrane module 2 increases, the liquid L easily flows to the hollow fiber membrane module 2. It is possible to appropriately set a timing in which at least one of the second on-off valve 15 and the second on-off valve 16 is closed. For example, the flow rate in which the resistivity of the liquid L increases is measured in advance. Then, at least one of the second on-off valve 15 and the second on-off valve 16 may be closed at the time of detecting a state where the flow rate of the liquid L measured by the flowmeter F becomes the flow rate in which the resistivity of the liquid L increases.

Since the discharge step is the same as that of the first embodiment, a description will be omitted.

In this way, in the resistivity adjustment device 1C of the embodiment, the second passages 13a and 14a are opened by the second on-off valves 15 and 16 in a normal state, but when the flow rate of the liquid L decreases, the second passages 13a and 14a are closed by the second on-off valves 15 and 16. Then, since the second passages 13a and 14a are closed by the second on-off valves 15 and 16, the pressure loss of the liquid L bypassing the hollow fiber membrane module 2 increases. Accordingly, it is possible to suppress a decrease in ratio of the flow rate of the liquid L flowing to the hollow fiber membrane module 2 with respect to the flow rate of the liquid L bypassing the hollow fiber membrane module 2. As a result, it is possible to suppress an increase in resistivity of the liquid L even when the flow rate of the liquid L decreases.

Fourth Embodiment

Next, a fourth embodiment will be described. A fourth embodiment is an embodiment obtained by the combination of the first to third embodiments. That is, the first embodiment further includes a leakage portion and a plurality of bypass pipes. For this reason, in the description below, only the different points from the first to third embodiments will be described and the same points as the first to third embodiments will not be described.

Figure 4:
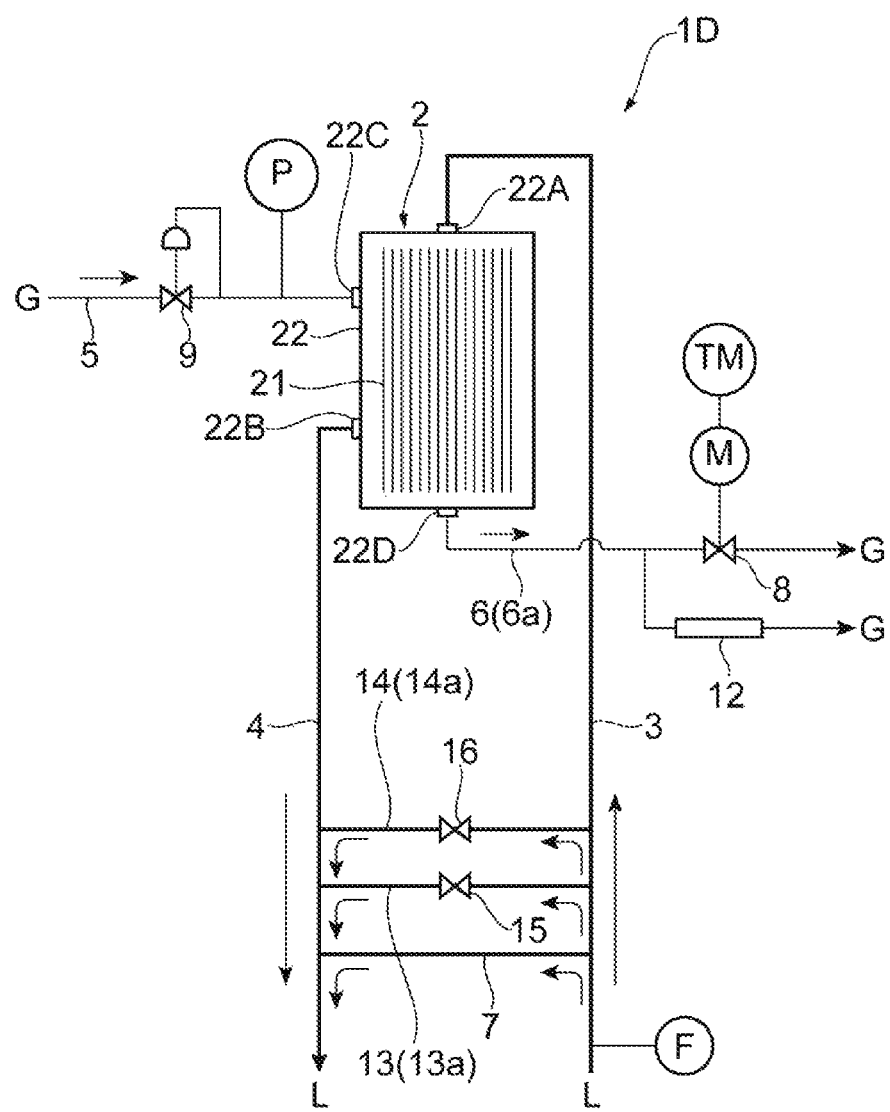
FIG. 4 is a schematic diagram of a resistivity adjustment device of a fourth embodiment.

FIG. 4 is a schematic diagram of a resistivity adjustment device of the fourth embodiment. As illustrated in FIG. 4, a resistivity adjustment device 1D of the embodiment includes the hollow fiber membrane module 2, the liquid supply pipe 3, the liquid discharge pipe 4, the gas supply pipe 5, the gas discharge pipe 6, the bypass pipe 7, the first on-off valve 8, the leakage portion 12, the second bypass pipe 13, and the second bypass pipe 14.

The leakage portion 12 is the same as the leakage portion 12 of the second embodiment. The second bypass pipe 13 and the second bypass pipe 14 are the same as the second bypass pipe 13 and the second bypass pipe 14 of the third embodiment. Further, the second on-off valve 15 and the second on-off valve 16 which are the same as the second on-off valve 15 and the second on-off valve 16 of the third embodiment are respectively connected to the second bypass pipe 13 and the second bypass pipe 14.

In this way, in the resistivity adjustment device 1D of the embodiment, it is possible to obtain the same operation and effect as those of the second and third embodiments in addition to the operation and effect of the first embodiment.

While the embodiments of the invention have been described, the invention is not limited to the above-described embodiments. For example, in the above-described embodiments, a case in which the first on-off valve 8 is opened or closed by the timer unit TM every regular time has been described. However, the opening/closing timing of the first on-off valve 8 can be appropriately set. For example, the first on-off valve 8 may be opened or closed at the time of detecting a state where a predetermined amount of water is accumulated in the gas phase side area GA or the gas discharge pipe 6.

EXAMPLES

Next, examples of the invention will be described, but the invention is not limited to the following examples.

Example 1

In Example 1, the resistivity adjustment device 1C of the third embodiment illustrated in FIG. 3 was used.

As the liquid L supplied to the liquid supply pipe 3, ultrapure water having a resistivity of 18.2 [MΩ·cm] at 25 [° C.] was used. The flow rate of the liquid L supplied to the liquid supply pipe 3 was changed between 5 to 30 [L/min]. A flow rate keeping time in which a constant flow rate is kept was set to 30 seconds and the flow rate was gradually changed. The water pressure of the liquid L supplied to the liquid supply pipe 3 was set to 0.3 [MPa].

As the adjustment gas G supplied to the gas supply pipe 5, a carbon dioxide gas was used. As a carbon dioxide gas supply source, a carbon dioxide gas cylinder of 7 [m³] was used. As the pressure adjustment valve 9, a two-stage pressure regulator and a pressure regulating valve were used and the gas pressure of the adjustment gas G supplied to the gas phase side area GA of the hollow fiber membrane module 2 was set to 0.1 [MPa].

As the hollow fiber membrane module 2, an external perfusion type gas supply hollow fiber module (SEPAREL EF-002A manufactured by DIC Corporation) having a membrane area of 2.0 [m²] was obtained by bundling the hollow fiber membrane 21 formed of poly-4-methylpentene-1 and having an inner diameter of 180 [μm] and an outer diameter of 250 [μm] and hardening both ends of the bundle of the hollow fiber membrane 21 inside the housing 22 formed of PP resin. The carbon dioxide gas permeation rate of the hollow fiber membrane 21 was $3.5 \times 10^{-5}$ [cm³/cm²·sec·cmHg].

Then, the liquid L was supplied to the liquid supply pipe 3 and the adjustment gas G was supplied to the gas supply pipe 5 while the first passage 6a is closed by the first on-off valve 8. The liquid L supplied to the liquid supply pipe 3 was distributed to a flow having a relatively low flow rate and flowing to the liquid phase side area LA of the hollow fiber membrane module 2 and a flow having a relatively high flow rate and flowing to the bypass pipe 7, the second bypass pipe 13, and the second bypass pipe 14 while bypassing the hollow fiber membrane module 2 and both flows were merged at the liquid discharge pipe 4. The adjustment gas G supplied to the gas supply pipe 5 was adjusted to 0.1 [MPa] by the pressure adjustment valve 9 and then was supplied to the gas phase side area GA of the hollow fiber membrane module 2. In the hollow fiber membrane module 2, the adjustment gas G permeated the hollow fiber membrane 21 and was dissolved in the liquid L flowing in the liquid phase side area LA inside the hollow fiber membrane 21 and the liquid L became $CO_2$ addition ultrapure water having a carbon dioxide gas added thereto. At this time, the second on-off valves 15 and 16 were adjusted so that the resistivity of the $CO_2$ addition ultrapure water became 0.1 [MΩ·cm]. Further, the first on-off valve 8 was opened by the timer unit TM for 1 second (1 L) every 15 minutes.

Then, the resistivity of the $CO_2$ addition ultrapure water (the liquid L) discharged from the liquid discharge pipe 4 was measured. This measurement result is shown in FIG. 5.

Figure 5:
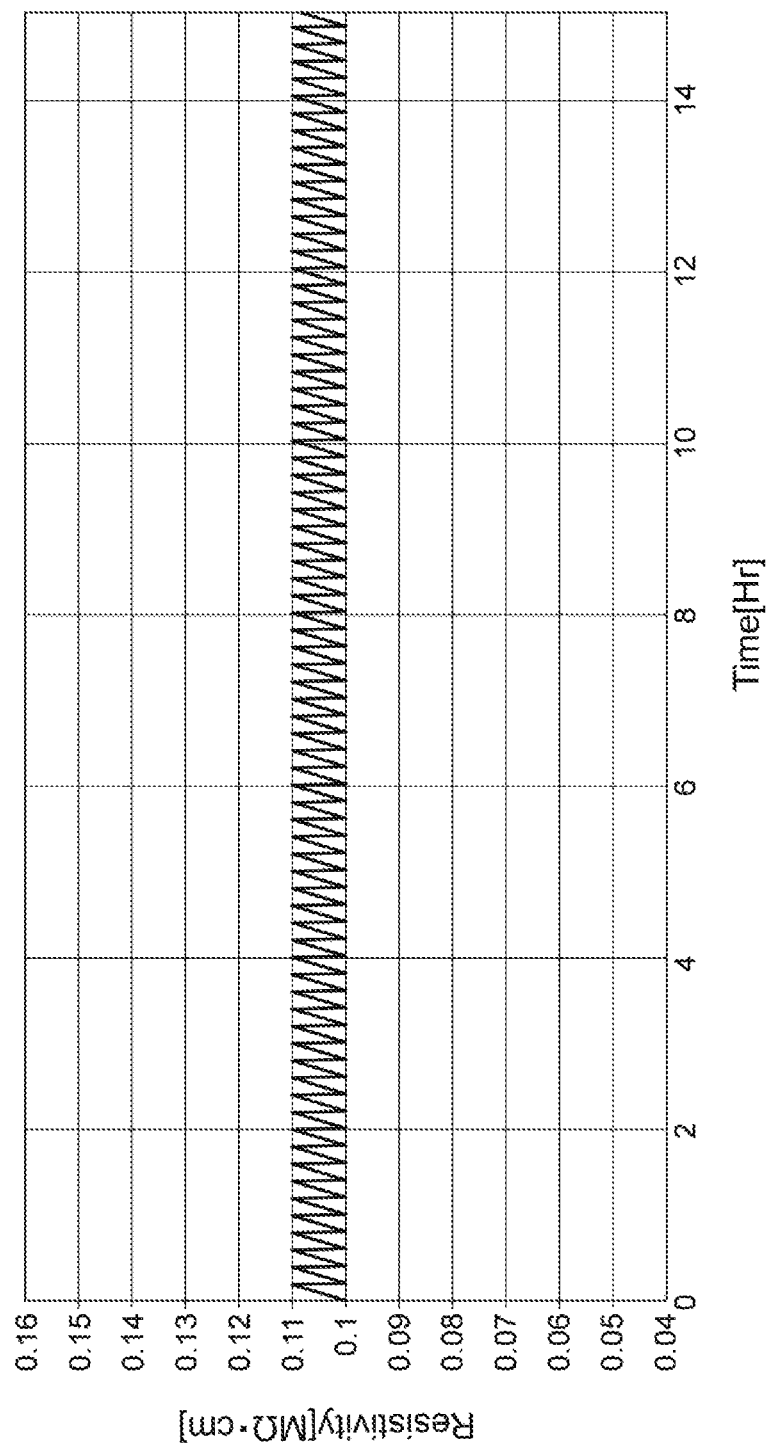
FIG. 5 is a graph showing a measurement result of Example 1.

In FIG. 5, the vertical axis indicates the measured resistivity and the horizontal axis indicates the elapse time. As shown in FIG. 5, in Example 1, the deviation of the resistivity was within 0.1 [MΩ·cm]±0.02 [MΩ·cm] and almost no change in resistivity was observed. This was because an increase in resistivity due to the influence of the water vapor diffused back to the gas phase side area GA was effectively suppressed by the water discharged from the gas phase side area GA in Example 1.

Example 2

In Example 2, the resistivity adjustment device 1D of the fourth embodiment illustrated in FIG. 4 was used.

A hollow fiber capillary was used as the leakage portion 12 and the flow rate of the adjustment gas G passing through the leakage portion 12 was set to 50 [ml/min]. Further, the first on-off valve 8 was opened for 1 second (1 L) every hour by the timer unit TM. The same condition as that of Example 1 was set.

Figure 6:
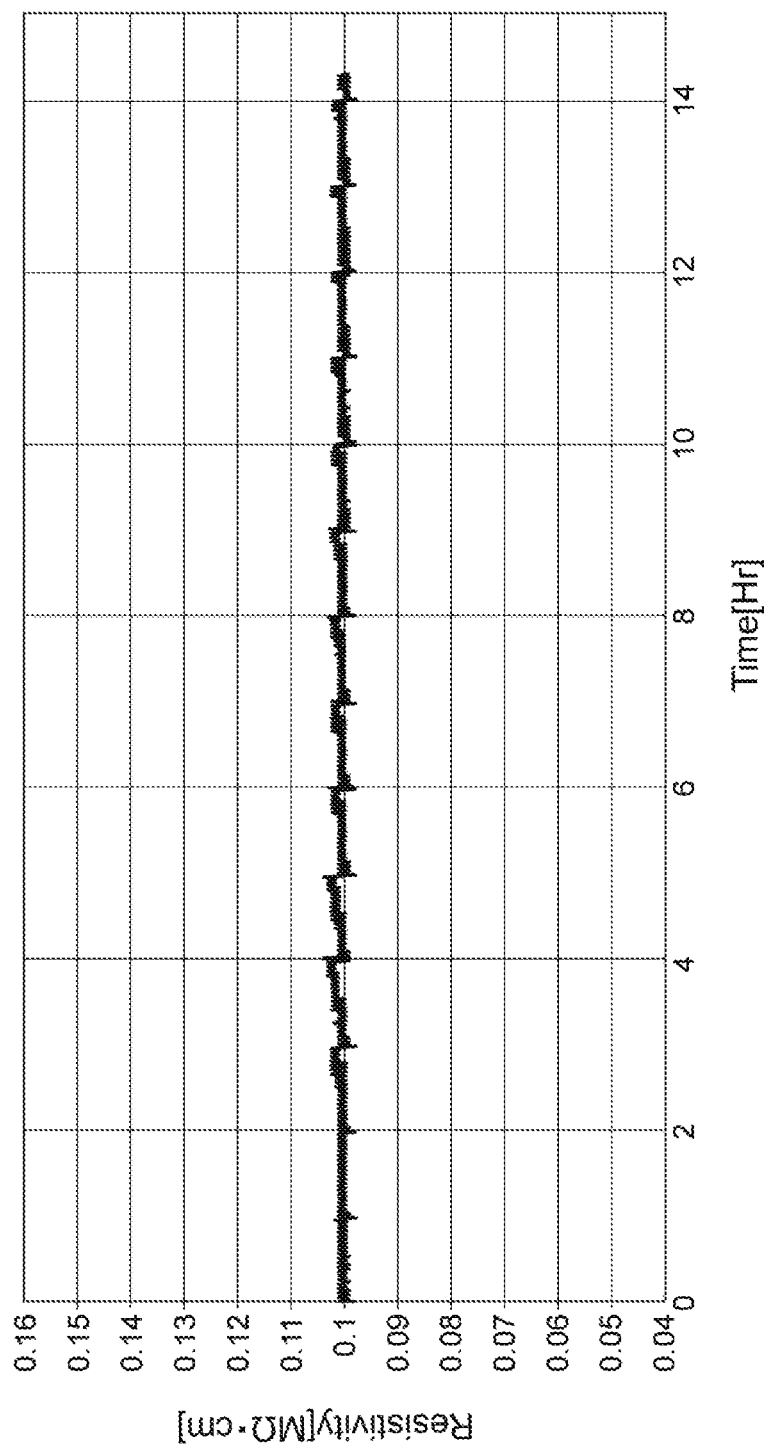
FIG. 6 is a graph showing a measurement result of Example 2.

Then, the resistivity of the $CO_2$ addition ultrapure water (the liquid L) discharged from the liquid discharge pipe 4 was measured. This measurement result is shown in FIG. 6. In FIG. 6, the vertical axis indicates the measured resistivity and the horizontal axis indicates the elapse time.

As shown in FIG. 6, in Example 2, the deviation of the resistivity was within 0.1 [MΩ·cm]±0.005 [MΩ·cm] and almost no change in resistivity was observed. This was because an increase in resistivity due to the influence of the dissolved gas diffused back to the gas phase side area GA was effectively suppressed by the adjustment gas G normally discharged from the gas phase side area GA in Example 2 in addition to Example 1.

Example 3-1 and Example 3-2

In Example 3-1 and Example 3-2, the resistivity adjustment device 1D of the fourth embodiment illustrated in FIG. 4 was used similarly to Example 2.

In Example 3-1, the second on-off valve 15 was normally opened. In Example 3-2, when the flow rate of the liquid L measured by the flowmeter F was equal to or lower than 10 [L/min], the second on-off valve 15 was closed. The same condition as that of Example 2 was set.

Figure 7:
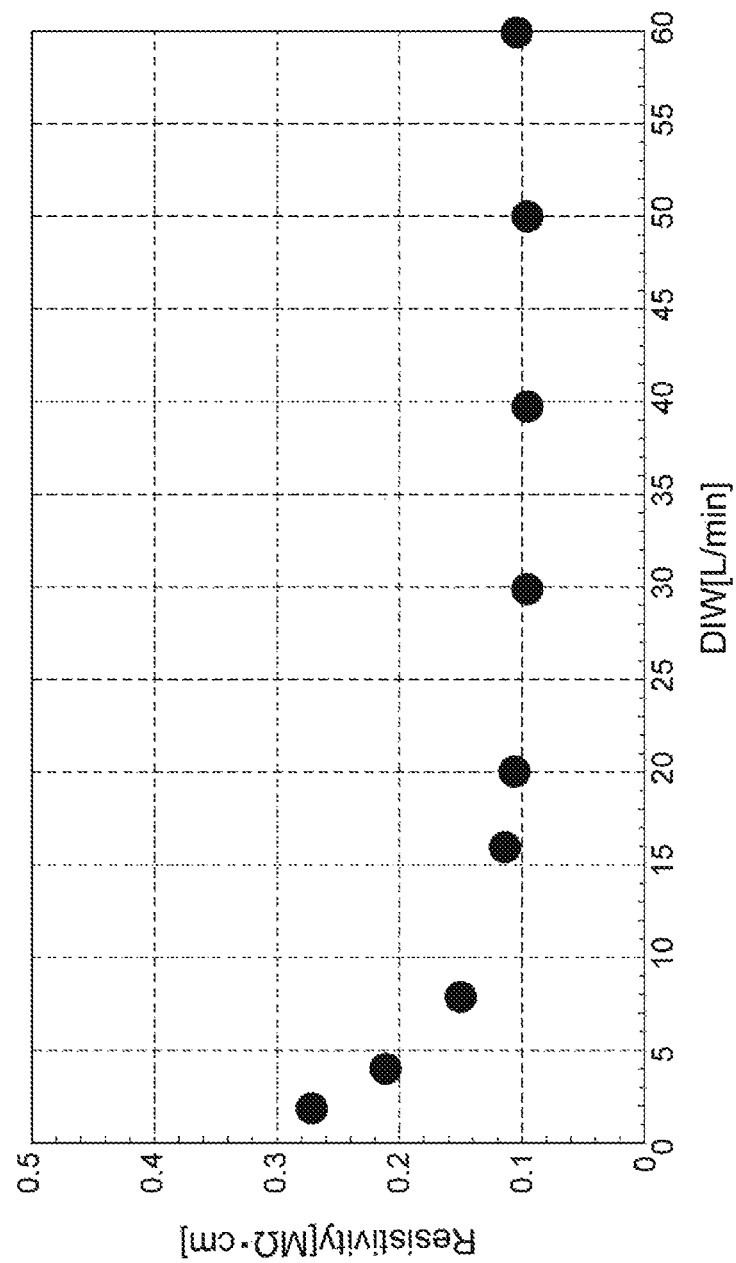
FIG. 7 is a graph showing a measurement result of Example 3-1.
Figure 8:
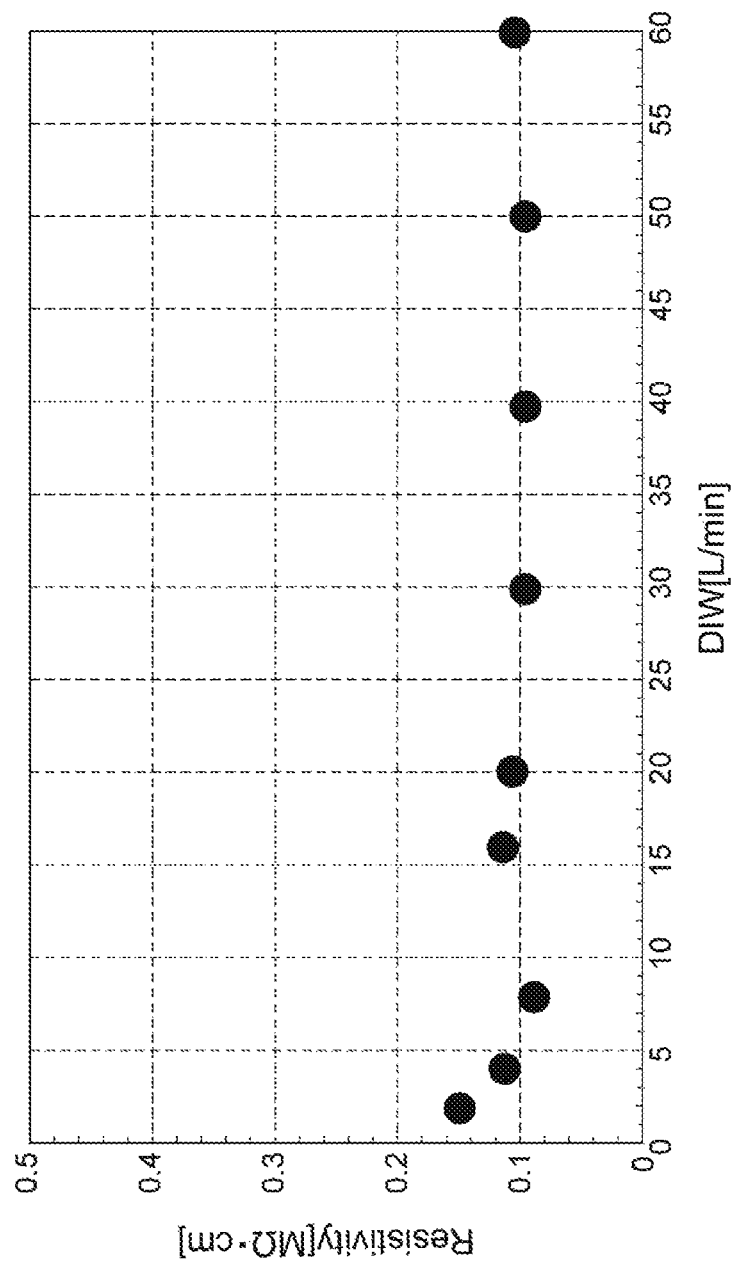
FIG. 8 is a graph showing a measurement result of Example 3-2.

Then, in Example 3-1 and Example 3-2, the resistivity of the $CO_2$ addition ultrapure water (the liquid L) discharged from the liquid discharge pipe 4 was measured. The measurement result of Example 3-1 is shown in FIG. 7 and the measurement result of Example 3-2 is shown FIG. 8. In FIGS. 7 and 8, the vertical axis indicates the measured resistivity and the horizontal axis indicates the flow rate (DIW) of the liquid L measured by the flowmeter F.

As shown in FIG. 7, in Example 3-1, when the flow rate of the liquid L was lower than 10 [L/min], the resistivity increased. This was because most of the liquid L bypassed the hollow fiber membrane module 2 and flowed into the bypass pipe 7, the second bypass pipe 13, and the second bypass pipe 14 since the liquid L hardly flowed to the hollow fiber membrane module 2 due to a decrease in flow rate of the liquid L.

Meanwhile, as shown in FIG. 8, also in Example 3-2, an increase (a change) in resistivity was suppressed even when the flow rate of the liquid L was equal to or lower than 10 [L/min]. This was because the liquid L also easily flowed to the hollow fiber membrane module 2 since the second on-off valve 15 was closed at the timing in which the resistivity started to increase (the timing in which the flow rate of the liquid L was about 10 [L/min]).

In addition, the measurement in Example 3-2 was continued for 1 week, but no change in resistivity caused by the influence of the water accumulated in the gas phase side area GA was found.

Comparative Example 1

Figure 9:
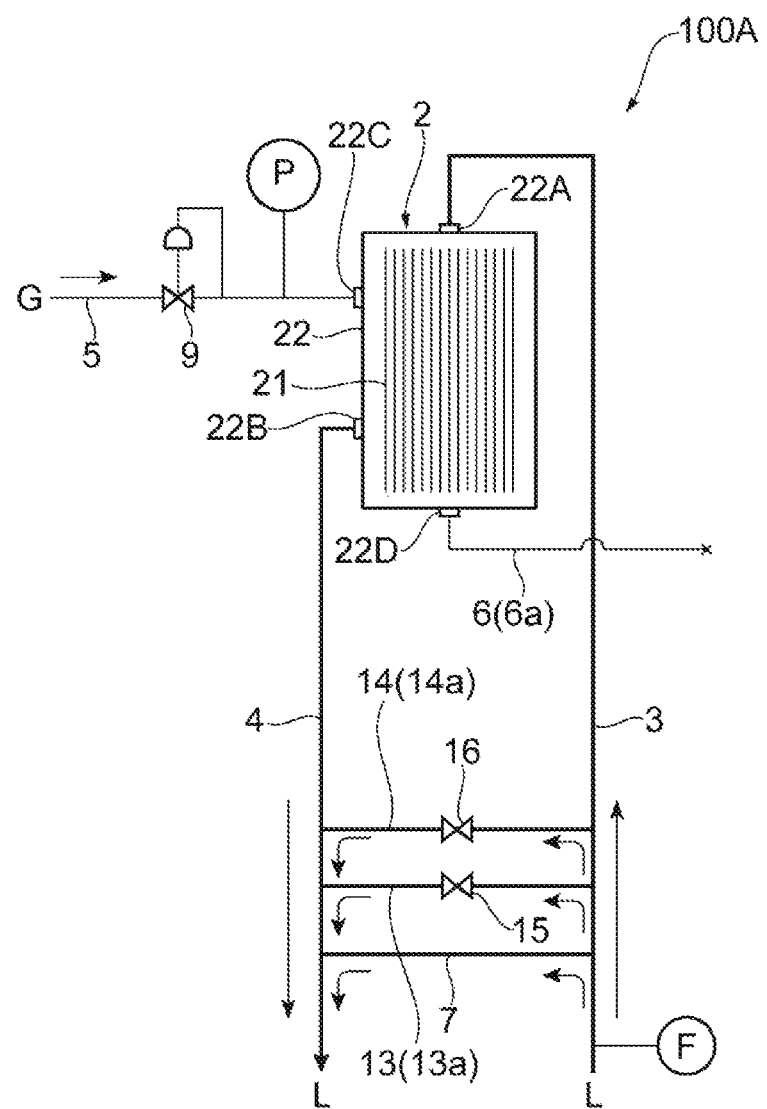
FIG. 9 is a schematic diagram of a resistivity adjustment device of Comparative Example 1.

In Comparative Example 1, the resistivity adjustment device 100A illustrated in FIG. 9 was used.

The resistivity adjustment device 100A is basically the same as the resistivity adjustment device 1C (see FIG. 3) of Example 1 and is different from the resistivity adjustment device 1C only in that the first on-off valve 8 and the timer unit TM are not provided and the gas discharge pipe 6 is sealed. That is, in the resistivity adjustment device 100A, the flow of the fluid in the gas discharge pipe 6 is interrupted and the fluid was not discharged from the gas discharge pipe 6.

In the resistivity adjustment device 100A, when the flow rate of the liquid L measured by the flowmeter F was equal to or lower than 10 [L/min], the second on-off valve 15 was closed. The same condition as that of Example 1 was set.

Figure 10:
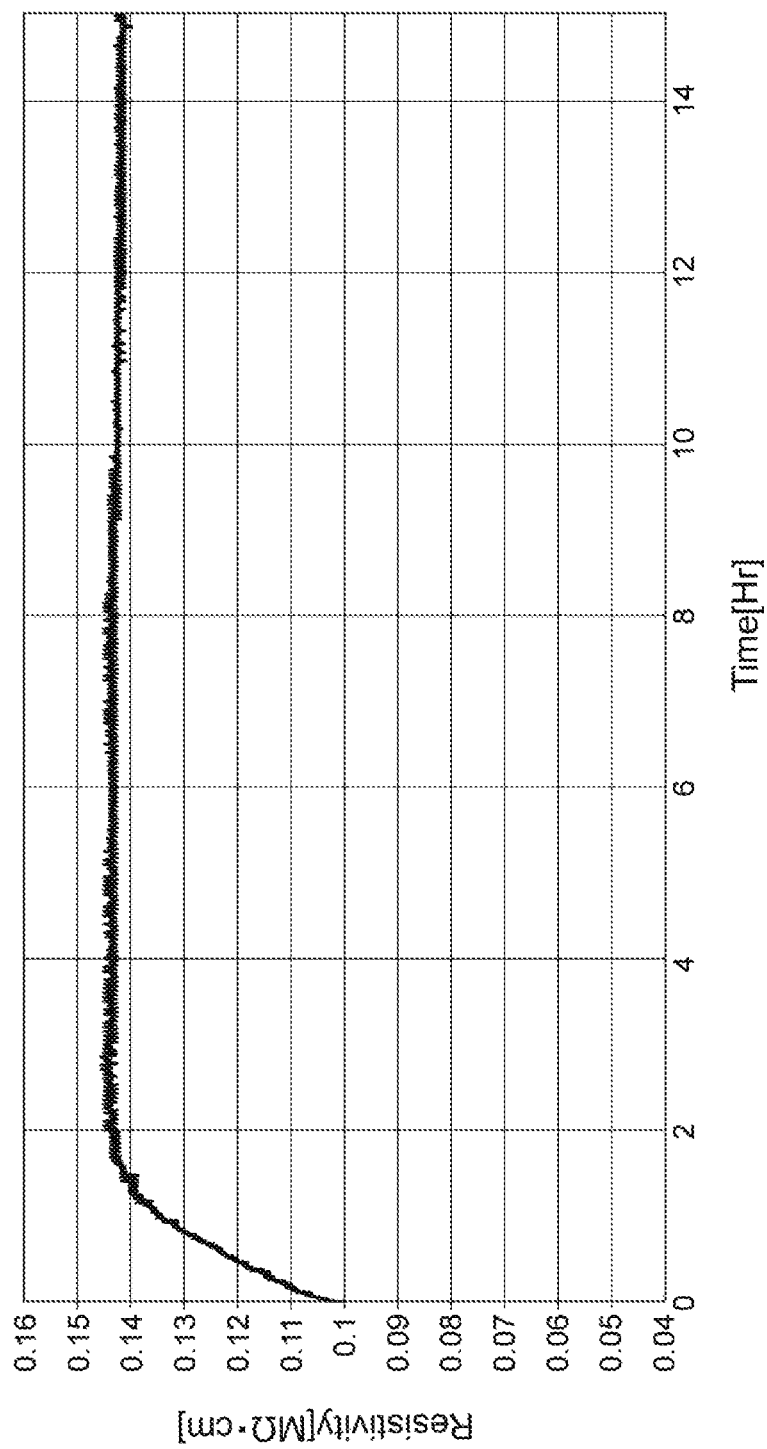
FIG. 10 is a graph showing a measurement result of Comparative Example 1.

Then, the resistivity of the $CO_2$ addition ultrapure water (the liquid L) discharged from the liquid discharge pipe 4 was measured. This measurement result is shown in FIG. 10. In FIG. 10, the vertical axis indicates the measured resistivity and the horizontal axis indicates the elapse time.

As shown in FIG. 10, in Comparative Example 1, when the flow rate of the liquid L was equal to or lower than 10 [L/min], the second on-off valve 15 was closed, but the resistivity set to 0.1 [MΩ·cm] was increased to 0.145 [MΩ·cm]. This was because the resistivity was increased due to the influence of the water accumulated in the gas phase side area GA and the dissolved gas diffused back to the gas phase side area GA in Comparative Example 1.

Comparative Example 2

Figure 11:
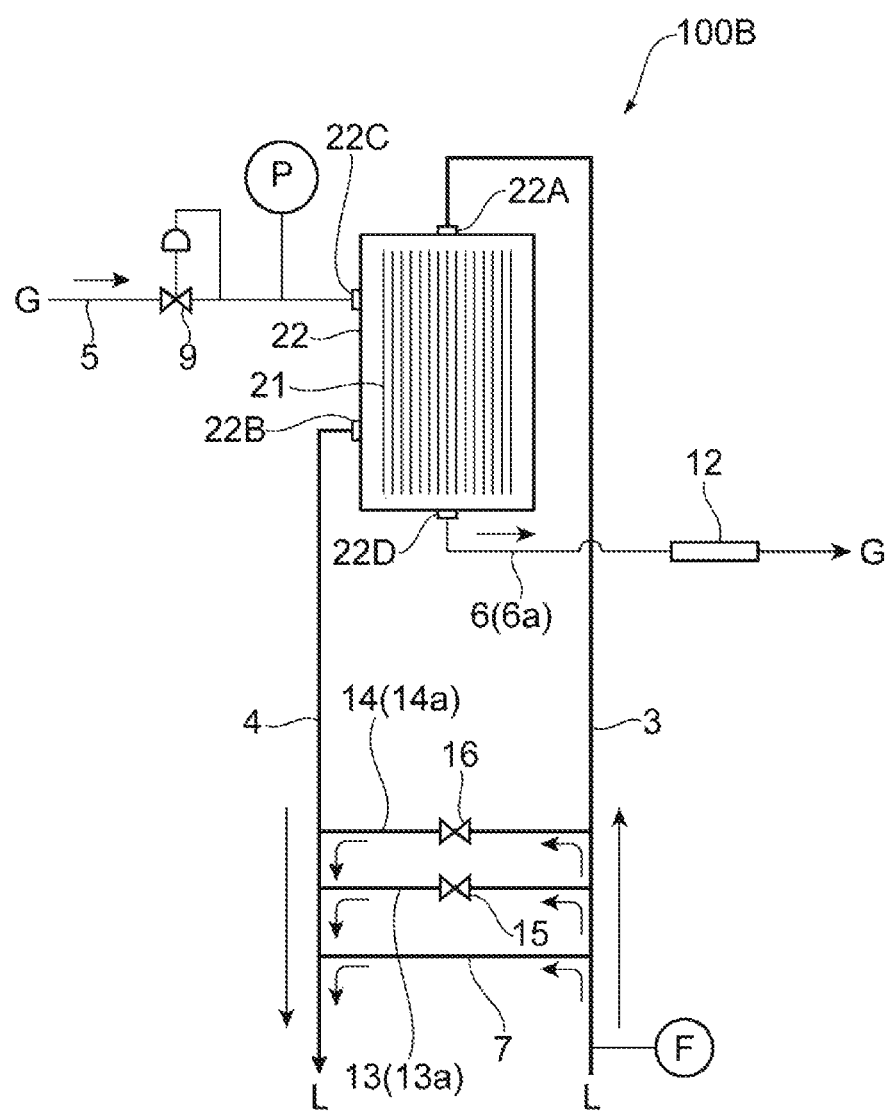
FIG. 11 is a schematic diagram of a resistivity adjustment device of Comparative Example 2.

In Comparative Example 2, the resistivity adjustment device 100B illustrated in FIG. 11 was used.

The resistivity adjustment device 100A is basically the same as the resistivity adjustment device 1D of Example 2 (see FIG. 4) and is different from the resistivity adjustment device 1D in that the first on-off valve 8 and the timer unit TM are not provided. That is, in the resistivity adjustment device 100A, the adjustment gas G leaks from the leakage portion 12, but the water accumulated in the gas phase side area GA is not discharged.

The same condition as that of Example 2 was set except that the first on-off valve 8 was not opened or closed.

Figure 12:
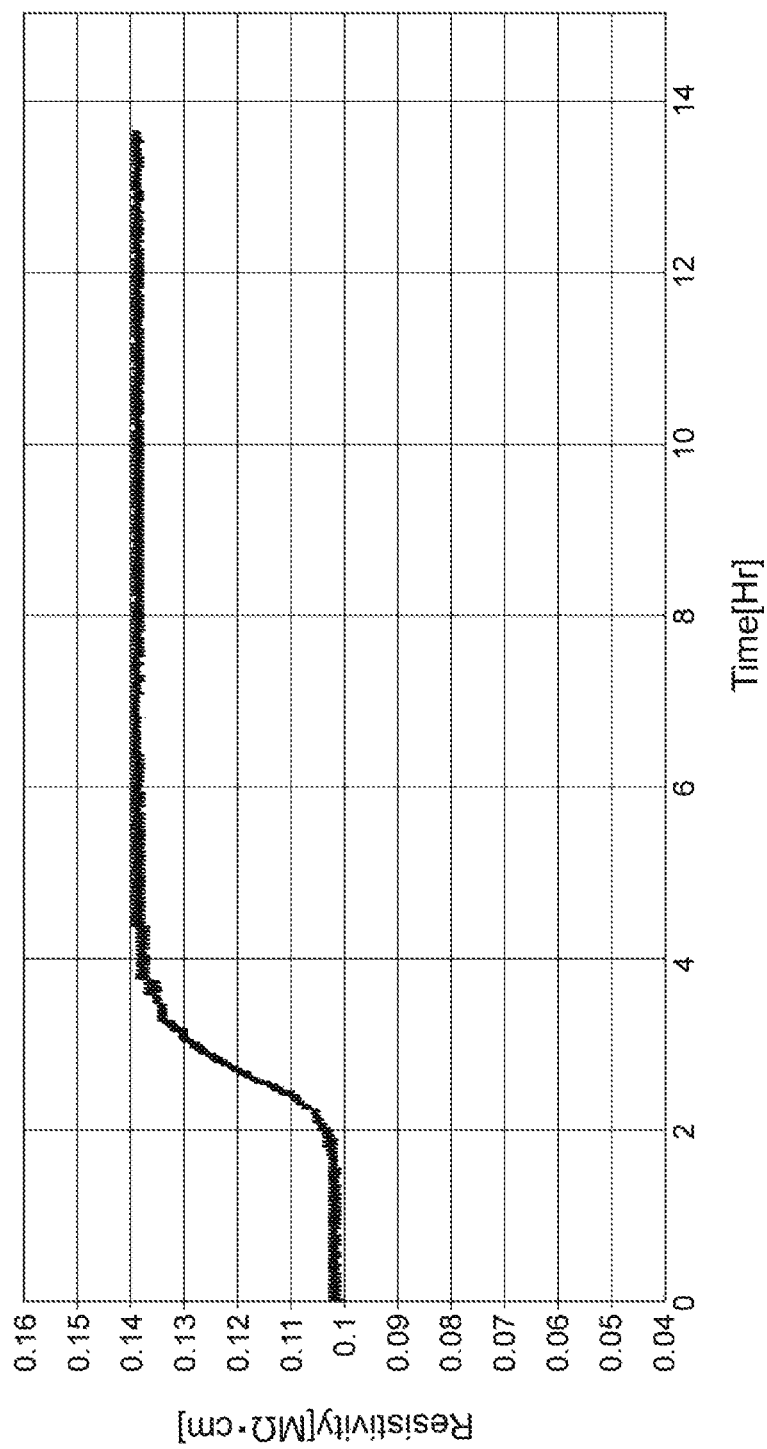
FIG. 12 is a graph showing a measurement result of Comparative Example 2.

Then, the resistivity of the $CO_2$ addition ultrapure water (the liquid L) discharged from the liquid discharge pipe 4 was measured. This measurement result is shown in FIG. 12. In FIG. 12, the vertical axis indicates the measured resistivity and the horizontal axis indicates the elapse time.

As shown in FIG. 12, in Comparative Example 2, the resistivity set to 0.1 [MΩ·cm] increased to 0.14 [MΩ·cm] after 6 hours elapsed. This was because the influence of the dissolved gas diffused back to the gas phase side area GA was improved to some extent, but the resistivity was increased by the influence of the water accumulated in the gas phase side area GA in Comparative Example 2.

REFERENCE SIGNS LIST 1A, 1B, 1C, 1D . . . resistivity adjustment device, 2 . . . hollow fiber membrane module, 3 . . . liquid supply pipe, 4 . . . liquid discharge pipe, 5 . . . gas supply pipe, 6 . . . gas discharge pipe, 6a . . . first passage, 7 . . . bypass pipe, 8 . . . first on-off valve, 9 . . . pressure adjustment valve, 12 . . . leakage portion, 13, 14 . . . second bypass pipe, 13a, 14a second passage, 15, 16 . . . second on-off valve, 21 . . . hollow fiber membrane, 22 . . . housing, 22A . . . liquid supply port, 22B . . . liquid discharge port, 22C . . . gas supply port, 22D . . . gas discharge port, 100A, 100B . . . resistivity adjustment device, F flowmeter, G adjustment gas, GA . . . gas phase side area, L . . . liquid, LA . . . liquid phase side area, P . . . pressure gauge, TM . . . timer unit.

The invention claimed is:

1. A resistivity adjustment device comprising:
    a hollow fiber membrane module that is divided by a hollow fiber membrane into a liquid phase side area to which a liquid adjusting a resistivity is supplied and a gas phase side area to which an adjustment gas adjusting a resistivity is supplied and dissolves the adjustment gas in the liquid;
    a liquid supply pipe that communicates with the liquid phase side area to supply the liquid to the liquid phase side area;
    a liquid discharge pipe that communicates with the liquid phase side area to discharge the liquid from the liquid phase side area;
    a gas supply pipe that communicates with the gas phase side area to supply the adjustment gas to the gas phase side area;
    a gas discharge pipe that communicates with the gas phase side area to discharge the adjustment gas from the gas phase side area;
    a bypass pipe that communicates with the liquid supply pipe and the liquid discharge pipe to bypass the hollow fiber membrane module; and
    a first on-off valve that is connected to the gas discharge pipe and opens or closes a first passage inside the gas discharge pipe,
    wherein the first on-off valve opens the first passage to discharge water accumulated in the gas phase side area.

2. The resistivity adjustment device according to claim 1, further comprising:
    a timer unit which opens or closes the first on-off valve every regular time.

3. The resistivity adjustment device according to claim 1, wherein when the first on-off valve is opened, a flow rate of a fluid passing through the first on-off valve is equal to or higher than 1 [L/min] and equal to or lower than 300 [L/min].

4. The resistivity adjustment device according to claim 1, wherein the gas discharge pipe communicates with the gas phase side area at a lower portion of the hollow fiber membrane module.

5. The resistivity adjustment device according to claim 1, further comprising:
    a leakage portion which is connected to the gas discharge pipe to be parallel to the first on-off valve and allows a leakage of the adjustment gas of the gas phase side area.

6. The resistivity adjustment device according to claim 5, wherein the flow rate of the fluid passing through the first on-off valve when the first on-off valve is opened is higher than a flow rate of the adjustment gas passing through the leakage portion.

7. The resistivity adjustment device according to claim 6, wherein the flow rate of the adjustment gas passing through the leakage portion is equal to or higher than 0 [mL/min] and equal to or lower than 1000 [mL/min].

8. The resistivity adjustment device according to claim 1, further comprising:
   a second bypass pipe that communicates with the liquid supply pipe and the liquid discharge pipe to bypass the hollow fiber membrane module; and
   a second on-off valve which opens or closes a second passage inside the second bypass pipe.

9. A resistivity adjustment method of adjusting a resistivity of a liquid by a hollow fiber membrane module that is divided by a hollow fiber membrane into a liquid phase side area to which a liquid adjusting a resistivity is supplied and a gas phase side area to which an adjustment gas adjusting a resistivity is supplied and dissolves the adjustment gas in the liquid, the resistivity adjustment method comprising:
   a resistivity adjustment step of adjusting the resistivity of the liquid by dissolving the adjustment gas in the liquid in such a manner that the adjustment gas passes through the gas phase side area while the liquid passes through the liquid phase side area and mixing the liquid having the adjustment gas dissolved therein with the liquid bypassing the hollow fiber membrane module; and
   a discharge step of discharging water accumulated in the gas phase side area by a first on-off valve opening or closing a first passage communicating with the gas phase side area,
   wherein in the resistivity adjustment step, the first passage is closed by the first on-off valve, and
   wherein in the discharge step, the first passage is opened by the first on-off valve.

10. The resistivity adjustment method according to claim 9,
   wherein in the resistivity adjustment step, the adjustment gas of the gas phase side area leaks from a leakage portion communicating with the first passage to be parallel to the first on-off valve.

11. A resistivity adjustment device comprising:
   a hollow fiber membrane module that is divided by a hollow fiber membrane into a liquid phase side area to which an ultrapure water adjusting a resistivity is supplied and a gas phase side area to which an adjustment gas adjusting a resistivity is supplied and dissolves the adjustment gas in the ultrapure water;
   a liquid supply pipe that communicates with the liquid phase side area to supply the ultrapure water to the liquid phase side area;
   a liquid discharge pipe that communicates with the liquid phase side area to discharge the ultrapure water from the liquid phase side area;
   a gas supply pipe that communicates with the gas phase side area to supply the adjustment gas to the gas phase side area;
   a gas discharge pipe that communicates with the gas phase side area to discharge the adjustment gas from the gas phase side area;
   a bypass pipe that communicates with the liquid supply pipe and the liquid discharge pipe to bypass the hollow fiber membrane module;
   a first on-off valve that is connected to the gas discharge pipe, opens or closes a first passage inside the gas discharge pipe, and discharges the water condensed in the gas phase side area and a dissolved gas diffused back to the gas phase side area from the liquid phase side area, and
   a timer unit which opens or closes the first on-off valve every regular time at least while the ultrapure water is being supplied to the liquid supply pipe and the adjustment gas is being supplied to the gas supply pipe; and
   wherein the timer unit is set so that a time in which the first on-off valve is opened is equal to or longer than 0.5 seconds and equal to or shorter than 1 minute, and
   when the first on-off valve is opened, the first on-off valve is set so that a flow rate of a fluid passing through the first on-off valve is equal to or higher than 1 [L/min] and equal to or lower than 300 [L/min].

12. The resistivity adjustment device according to claim 11,
   wherein when the first on-off valve is opened, a passage diameter of the first on-off valve and a passage length of the first on-off valve is set so that a flow rate of a fluid passing through the first on-off valve is equal to or higher than 1 [L/min] and equal to or lower than 300 [L/min].

13. The resistivity adjustment device according to claim 11,
   wherein the gas discharge pipe communicates with the gas phase side area at a lower portion of the hollow fiber membrane module.

14. The resistivity adjustment device according to claim 11, further comprising:
   a leakage portion which is connected to the gas discharge pipe to be parallel to the first on-off valve and allows a leakage of the adjustment gas of the gas phase side area.

15. The resistivity adjustment device according to claim 14,
   wherein the leakage portion is a capillary member having a thin passage formed therein.

16. The resistivity adjustment device according to claim 15,
   wherein the resistivity adjustment device is set so that the flow rate of the fluid passing through the first on-off valve when the first on-off valve is opened is higher than a flow rate of the adjustment gas passing through the leakage portion.

17. The resistivity adjustment device according to claim 16,
   wherein the flow rate of the adjustment gas passing through the leakage portion is equal to or higher than 0 [mL/min] and equal to or lower than 1000 [mL/min].

18. The resistivity adjustment device according to claim 11, further comprising:
   a second bypass pipe that communicates with the liquid supply pipe and the liquid discharge pipe to bypass the hollow fiber membrane module; and
   a second on-off valve which opens or closes a second passage inside the second bypass pipe.

* * * * *